United States Patent [19]
Kuljis

[11] Patent Number: 5,750,934
[45] Date of Patent: May 12, 1998

[54] COMPUTER MOUSE HOOK

[76] Inventor: Zoran R. Kuljis, 8 Farmview La., Granby, Conn. 06035

[21] Appl. No.: 811,767

[22] Filed: Mar. 6, 1997

[51] Int. Cl.⁶ .................................................... H01B 7/00
[52] U.S. Cl. ................................................ 174/135; 248/51
[58] Field of Search ............................ 174/135, 137 R; 248/51, 52, 560, 624, 918

[56] References Cited

U.S. PATENT DOCUMENTS

| | | | |
|---|---|---|---|
| 2,695,762 | 11/1954 | Wersching | 108/135 |
| 4,215,529 | 8/1980 | Gerbracht | 57/6 |
| 5,398,895 | 3/1995 | Whetherhult et al. | 248/51 |
| 5,472,157 | 12/1995 | Lehrman | 248/51 |
| 5,556,061 | 9/1996 | Dickie | 248/51 |
| 5,579,657 | 12/1996 | Makous | 248/51 |
| 5,593,128 | 1/1997 | Odom et al. | 248/918 |

*Primary Examiner*—Kristine L. Kincaid
*Assistant Examiner*—Dhiru R. Patel
*Attorney, Agent, or Firm*—Robert J. Harter

[57] ABSTRACT

A mouse cable holder (mouse hook) includes a base heavy enough to support a mast that suspends a computer mouse cable over a separate mouse pad. The mast is made of a single steel wire with an integral cable feed loop at its lower end and an integral mouse cable gripper at its upper end. The base can be slid over a table top to move the mouse cable holder to a desired position relative to the mouse pad. The base also serves as a spool to take up any excess cable between a computer and the mouse cable holder.

12 Claims, 3 Drawing Sheets

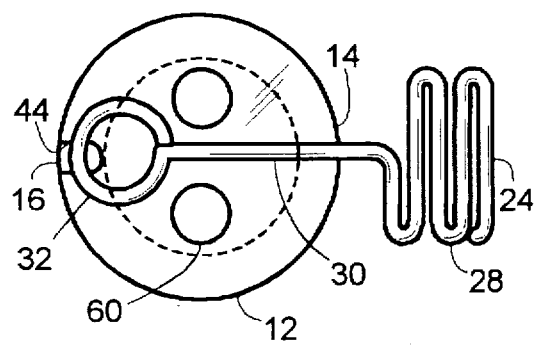
FIG. 3
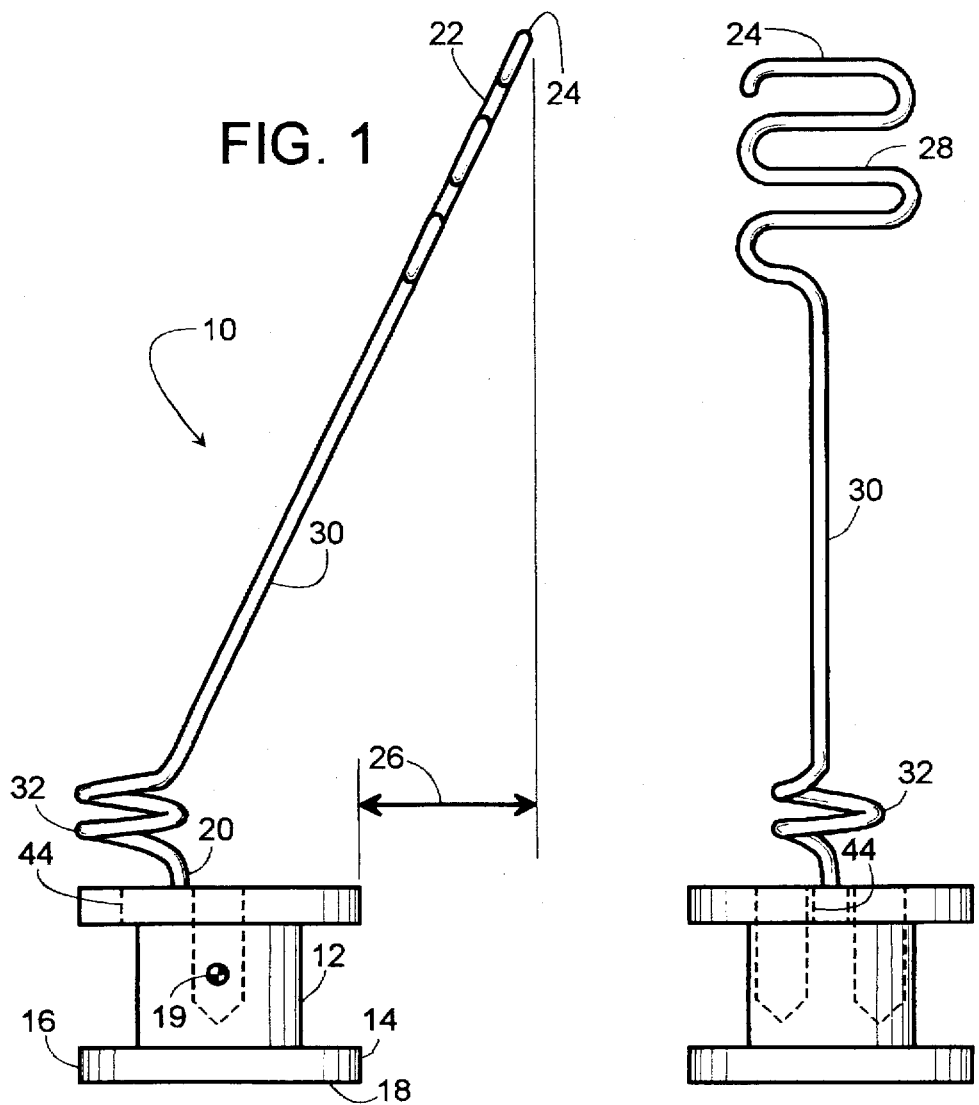
FIG. 1
FIG. 2

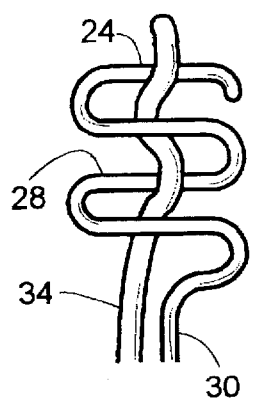
FIG. 5
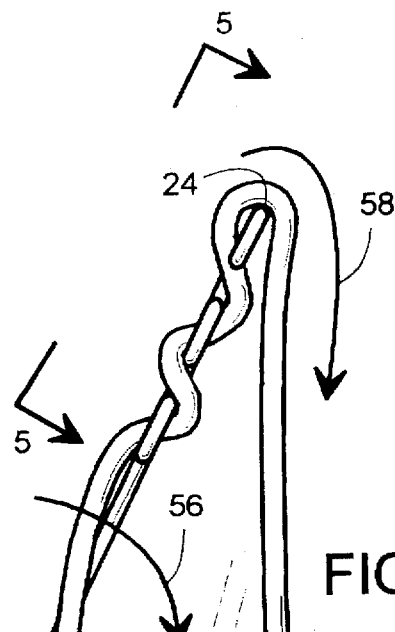
FIG. 4
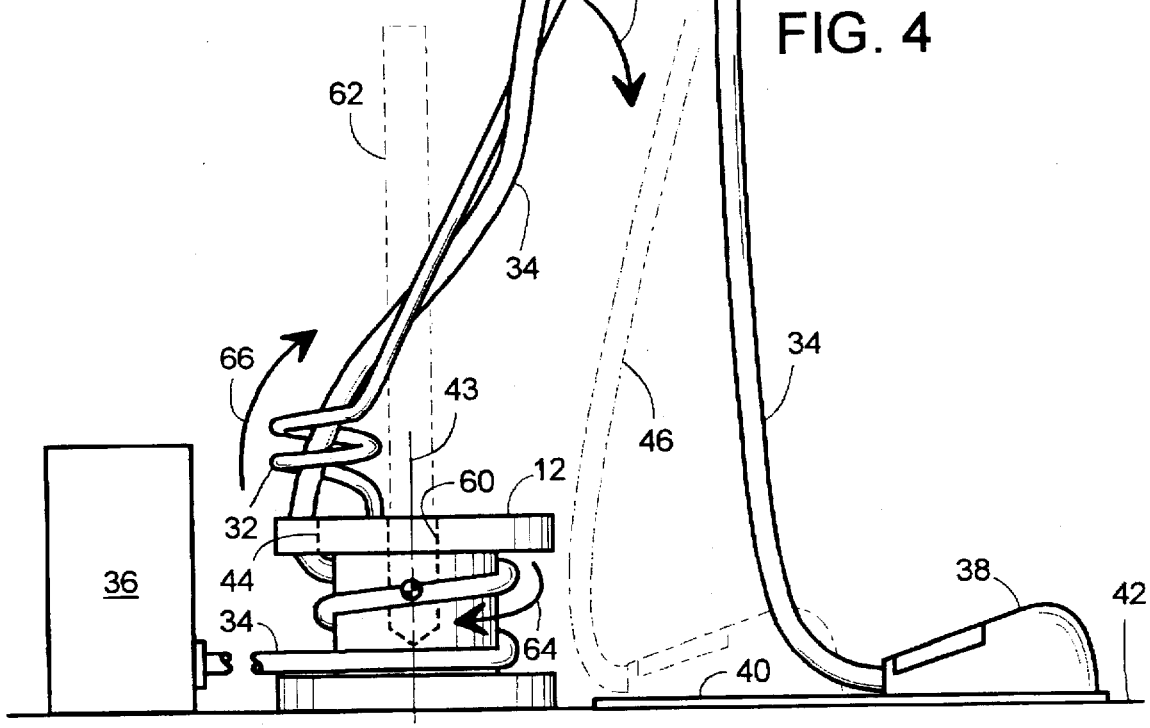

COMPUTER MOUSE HOOK

BACKGROUND OF THE INVENTION

1. Field of the Invention

The subject invention generally pertains to a computer mouse cable that connects a computer mouse to a personal computer, and more specifically to a means for preventing the cable from getting tangled.

2. Description of Related Art

Excess mouse cable between a computer and a computer mouse can result in a tangled mess. The cord holder of U.S. Pat. No. 5,398,895 addresses this problem by elevating the cable straight above a base fastened to a table top. Since the top of the cord holder doesn't extend out over the mouse pad, the length of cable must be longer than would otherwise be needed. In addition, since the cord is "threaded" through the upper portion of the cord holder, it might also "unthread" or "thread further". This can lead to excessive or insufficient cable length between the mouse and the holder. Furthermore, the '895 holder is screwed to the table top which limits its repositioning and damages the table. Lastly, the holder suggests no means for managing excess cable between the holder and the computer.

SUMMARY OF THE INVENTION

To manage excess cable between a computer and a computer mouse, it is an object of the invention to elevate and suspend a mouse cable beyond the base of a cable holder and out over a mouse pad.

A second object is to rely on the mass of a mouse cable holder's base to counteract the weight and tugging of the mouse cable.

A third object is to provide a means for storing and concealing excess cable between a computer and a mouse cable holder.

A fourth object is to provide a mouse cable holder that is readily repositioned relative to a mouse pad.

A fifth object is to provide a mouse cable holder with a mast having a cord gripper at its upper end to avoid cable slack between the upper and lower end of the cable holder.

A sixth object is to provide a mouse cable adapted to receive a mouse cable without having to disconnect it at either end.

A seventh object is to provide a mouse cable holder having a mast made from a single wire yet still incorporating a feed loop at its lower end and a cable gripper at its upper end.

An eighth object is to provide a mouse cable holder with a receptacle for holding pens and pencils.

These and other objects of the invention are provided by a novel mouse hook having a base heavy enough to support an overhanging wire mast. The mast has an integral feed loop (coil) near the base and an integral gripper that can grip a mouse cable at a point above a mouse pad. The base can be slid over a table top to move the mouse hook to a desired position relative to the mouse pad. The base also serves as a spool to take up any excess cable between a computer and the mouse hook.

BRIEF DESCRIPTION OF THE DRAWINGS

FIG. 1 is a side view of the invention.

FIG. 2 is a front view of FIG. 1.

FIG. 3 is a top view of the FIG. 1.

FIG. 4 is a side view of the invention connected to a mouse cable.

FIG. 5 is a view of FIG. 4 taken along line 5—5.

DESCRIPTION OF THE PREFERRED EMBODIMENT

Figure 6:
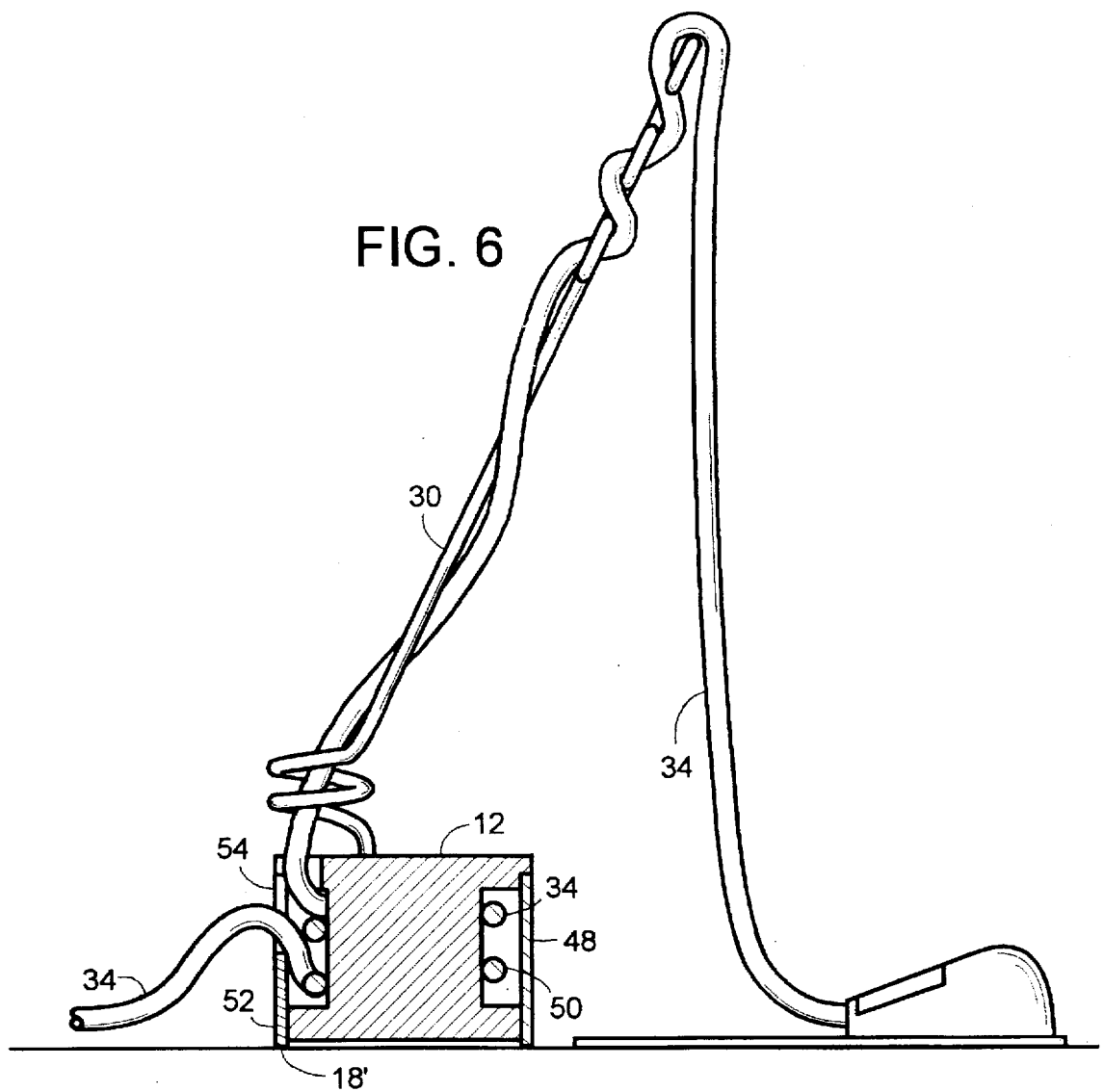
FIG. 6 is a side view of another embodiment of the invention with a cross-sectional view of its base and cylindrical cable cover.

Referring to FIGS. 1, 2 and 3, a mouse hook 10 includes a relatively heavy metal spool 12 having a front 14, a back 16, a bottom surface 18, and a center of gravity 19. Mouse hook 10 has a ⅛-inch diameter wire mast 30 with a lower end 20 attached to spool 12 and has an upper end 22 overhanging front 14 and bottom surface 18. The distance from where mast 30 connects to spool 12 is referred to as the length that mast 30 extends from spool 12. An extreme point 24 of upper end 22 extends laterally beyond spool 12 by a distance 26. A gripper 28 is at upper end 22 of mast 30, and a coil 32 is integrally formed at lower end 20.

When in use, as shown in FIG. 4, mouse hook 10 manages a mouse cable 34. Mouse cable 34 provides the connection between a conventional personal computer 36 and a computer mouse 38 resting on a mouse pad 40 which, in turn, is resting on a table top 42. A portion of cable 34 wraps around spool 12 (about a vertical line 43 passing through center of gravity 19), rises through a slit 44, threads through coil 32, runs upward along the length of mast 30, and weaves snugly through serpentine gripper 28 (see FIG. 5). Cable 34 is suspended from gripper 28 down to mouse 38. Point 24 extending over pad 40 minimizes the amount of cable slack needed for mouse 38 to travel across pad 40 as indicated by phantom line 46 of FIG. 4. The weight of spool 12 counteracts any tipping moment exerted by the weight of mast 30 and hanging cable 34 as indicated by arrows 56 and 58, respectively. For practical use, it has been found that the weight of spool 12 must be able to counteract the tension of at least 30 grams of weight or tugging from cable 34.

In FIG. 6, a cable restrainer 48 holds a portion 50 of cable 34 wrapped around spool 12. In one embodiment of the invention, restrainer 48 is a cylindrical sleeve 52 that slips over spool 12 to enclose portion 50 of cable 34. Sleeve 52 includes a slit 54 which cable 34 fits through. With sleeve 52, the bottom surface of spool 12 is identified by numeral 18'.

Figure 7:
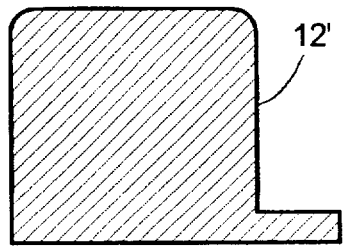
FIG. 7 shows a cross-sectional view of another embodiment of the invention.
Figure 8:
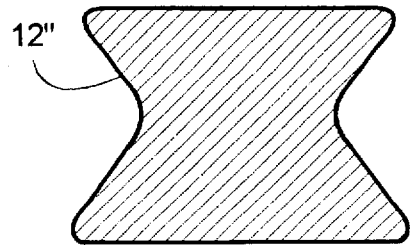
FIG. 8 shows a cross-sectional view of another embodiment of the invention.

In one embodiment of the invention, spool 12 includes a cavity 60 (FIGS. 1–4) adapted to hold a writing instrument 62, such as a pen or pencil. In FIG. 4, arrow 64 represents the step of coiling cable 34 and arrow 66 represents the step of threading cable 34 through coil 32. FIG. 5 illustrates the step of gripping cable 34 by weaving it through gripper 28 of mast 30 at point 24. FIGS. 7 and 8 show cross-sections of alternate embodiments identified respectively as spool 12' and 12".

It should be noted that the term "gripper" refers to any device for inhibiting cable 34 from moving in a direction lengthwise along cable 34. A serpentine gripper is just one example, and others would include but not be limited to a clip, a wire tie, a knot, and a clamp.

Although the invention is described with respect to a preferred embodiment, modifications thereto will be apparent to those skilled in the art. Therefore, the scope of the invention is to be determined by reference to the claims which follow.

I claim:

1. A computer mouse system, comprising:

a computer;

a computer mouse;

a mouse cable connecting said computer to said computer mouse;

a spool having a weight and a center of gravity;

a mast attached to said spool and extending a length from said spool, with said mouse cable extending along said length, said mouse cable having a portion coiled a plurality of turns about a vertical line passing through said center of gravity, said mast having a lower end and an upper end with said lower end being attached to said spool and said upper end overhanging laterally beyond said spool toward said computer mouse; and a gripper having a serpentine wire through which said mouse cable is woven, said gripper being integrally disposed on said upper end of said mast, said gripper inhibiting said mouse cable from pulling through said gripper in a direction lengthwise along said mouse cable.

2. The computer mouse system of claim 1, further comprising a coil integrally incorporated in said lower end of said mast with said mouse cable running through said coil.

3. A mouse hook for managing a mouse cable, said mouse cable connecting a computer to a computer mouse resting on a mouse pad which in turn is resting on a table top, said mouse hook comprising:

a spool having a weight, a front, a back, and a bottom surface, said bottom surface lying against said table top with said front facing said mouse pad;

a mast having a lower end and an upper end, said lower end being attached to said spool, said upper end overhanging beyond said front and said bottom surface and extending over said table top toward said mouse pad;

a coil incorporated into said lower end of said mast, said coil receiving said mouse cable; and a gripper disposed on said upper end of said mast, said gripper inhibiting said mouse cable from pulling through said gripper in a direction lengthwise along said mouse cable, said weight of said spool being sufficient to maintain said bottom surface flat against said table top by counteracting any moment applied to said spool by said weight of said mast plus at least 30 grams of tension from said mouse cable hanging from said gripper.

4. The mouse hook of claim 3 wherein said mast, said coil and said gripper comprise a unitary piece.

5. The mouse hook of claim 4 wherein said gripper includes a serpentine wire through which said mouse cable is woven.

6. The mouse hook of claim 3 wherein said spool has a cavity adapted to hold a writing instrument.

7. The mouse hook of claim 3 further comprising a cable restrainer attached to said spool and holding said mouse cable in a coiled configuration around said spool.

8. The mouse hook of claim 7 wherein said spool includes a sliding sleeve that covers a portion of said mouse cable when said portion is coiled around said spool.

9. A mouse hook for managing a mouse cable, said mouse cable connecting a computer to a computer mouse resting on a mouse pad which in turn is resting on a table top, said mouse hook comprising:

a spool having a weight, a front, a back, and a bottom surface lying against said table top with said front facing said mouse pad;

a mast having a lower end and an upper end, said lower end being attached to said spool, said upper end overhanging beyond said front and said bottom surface and extending over said table top toward said mouse pad;

a coil receiving said mouse cable therethrough and integrally incorporated into said lower end of said mast; and a serpentine gripper integrally disposed on said upper end of said mast, so that said mast, said coil and said serpentine gripper comprise a unitary piece of wire, said mouse cable being woven through said serpentine gripper to inhibit said mouse cable from pulling through said serpentine gripper in a direction lengthwise along said mouse cable, said spool being of sufficient weight to maintain said bottom surface flat against said table top by counteracting any moment applied to said spool by the weight of said mast plus at least 30 grams of tension from said mouse cable hanging from said serpentine gripper.

10. The mouse hook of claim 9 wherein said spool has a cavity adapted to hold a writing instrument.

11. The mouse hook of claim 9 further comprising a cable restrainer attached to said spool and holding said mouse cable in a coiled configuration around said spool.

12. The mouse hook of claim 11 wherein said spool includes a sliding sleeve that covers a portion of said mouse cable when said portion is coiled around said spool.

* * * * *